United States Patent
Dong

(10) Patent No.: US 11,670,324 B2
(45) Date of Patent: Jun. 6, 2023

(54) METHOD FOR PREDICTING EMOTION STATUS AND ROBOT

(71) Applicant: HUAWEI TECHNOLOGIES CO., LTD., Guangdong (CN)

(72) Inventor: Mingjie Dong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 838 days.

(21) Appl. No.: 16/551,687

(22) Filed: Aug. 26, 2019

(65) Prior Publication Data

US 2019/0385066 A1 Dec. 19, 2019

Related U.S. Application Data

(63) Continuation of application No. PCT/CN2018/077151, filed on Feb. 24, 2018.

(30) Foreign Application Priority Data

Feb. 27, 2017 (CN) .......................... 201710107006.2

(51) Int. Cl.
*G10L 25/66* (2013.01)
*G10L 25/63* (2013.01)

(52) U.S. Cl.
CPC .............. *G10L 25/66* (2013.01); *G10L 25/63* (2013.01); *G06F 2203/011* (2013.01)

(58) Field of Classification Search
CPC ..................................................... G10L 25/63
See application file for complete search history.

(56) References Cited

U.S. PATENT DOCUMENTS

| D746,886 S | 1/2016 | Breazeal et al. |
| D761,895 S | 7/2016 | Breazeal et al. |
| 2006/0149428 A1 | 7/2006 | Kim et al. |
| 2008/0201370 A1* | 8/2008 | Kemp .................. G06F 16/635 |

(Continued)

FOREIGN PATENT DOCUMENTS

| CN | 101474481 B | 7/2010 |
| CN | 105605746 A | 5/2016 |

(Continued)

OTHER PUBLICATIONS

Yang Kyon-Mo et al: "Modular dynamic Bayesian network based on Markov boundary for emotion prediction in multi-sensory environment", 2014 10th International Conference on Natural Computation (ICNC), IEEE, Aug. 19, 2014 (Aug. 19, 2014), pp. 1131-1136, XP032697403.

*Primary Examiner* — Jialong He
(74) *Attorney, Agent, or Firm* — Womble Bond Dickinson (US) LLP

(57) ABSTRACT

This application related to Artificial Intelligence technical field and discloses a robot and a method for predicting an emotion status by a robot. The method includes: determining a first emotion status of a first user, where the first emotion status is an emotion status of the first user at a first moment; predicting a second emotion status based on the first emotion status and a first emotion prediction model, where the second emotion status is an emotion status of the first user at a second moment, and the second moment is later than the first moment; and outputting a response to the first user based on the second emotion status.

26 Claims, 6 Drawing Sheets

---

S210: Determine a first emotion status of a first user, where the first emotion status is an emotion status of the first user at a first moment

↓

S220: Predict a second emotion status based on the first emotion status and a first emotion prediction model, where the second emotion status is an emotion status of the first user at a second moment, and the second moment is later than the first moment

↓

S230: Output a response to the first user based on the second emotion status

(56) References Cited

U.S. PATENT DOCUMENTS

| | | | |
|---|---|---|---|
| 2010/0257263 A1 | 10/2010 | Casado et al. | |
| 2013/0018837 A1* | 1/2013 | Lee | A61B 5/165 |
| | | | 706/52 |
| 2014/0112556 A1* | 4/2014 | Kalinli-Akbacak | G10L 17/26 |
| | | | 382/128 |
| 2014/0277735 A1 | 9/2014 | Breazeal | |
| 2014/0280529 A1* | 9/2014 | Davis | G06F 40/30 |
| | | | 709/204 |
| 2015/0213002 A1* | 7/2015 | Gou | G06F 40/30 |
| | | | 704/9 |
| 2015/0314454 A1 | 11/2015 | Breazeal et al. | |
| 2016/0151917 A1 | 6/2016 | Faridi et al. | |
| 2016/0171979 A1 | 6/2016 | Breazeal et al. | |
| 2016/0193732 A1 | 7/2016 | Breazeal et al. | |
| 2016/0199977 A1 | 7/2016 | Breazeal | |
| 2017/0011640 A1 | 1/2017 | Rebolledo-Mendez | |
| 2018/0240454 A1* | 8/2018 | Raj | G06F 3/167 |

FOREIGN PATENT DOCUMENTS

| | | |
|---|---|---|
| CN | 105930372 A | 9/2016 |
| CN | 106182032 A | 12/2016 |
| CN | 106214163 A | 12/2016 |
| CN | 106956271 A | 7/2017 |
| GB | 2524505 A | 9/2015 |
| JP | 2012-115312 A | 6/2012 |
| KR | 2013-0082701 A | 7/2013 |

* cited by examiner

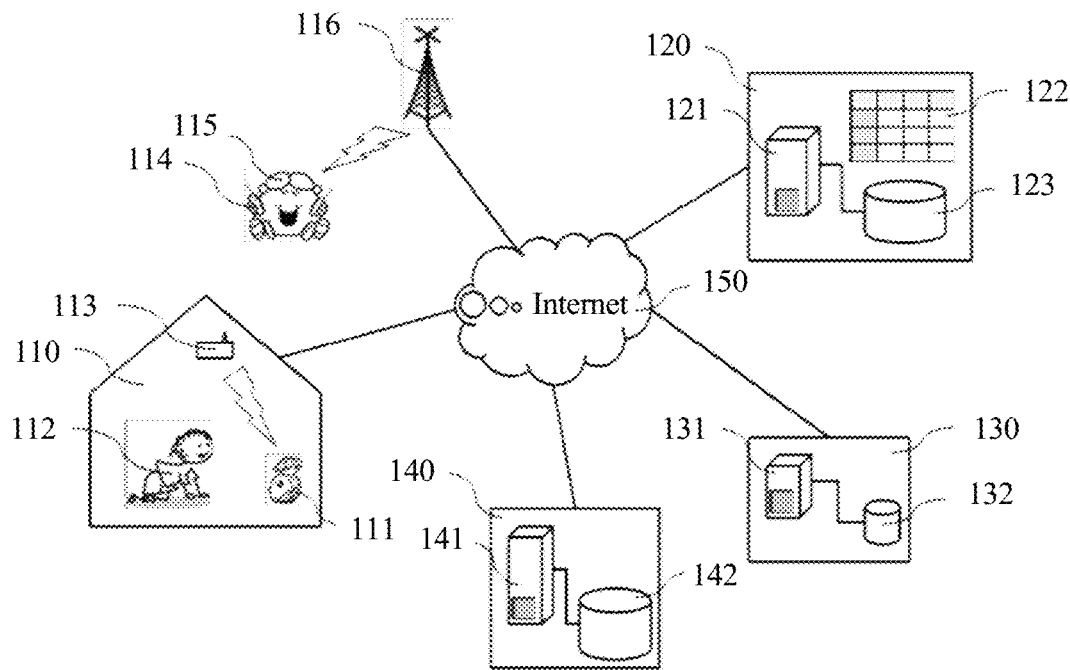

FIG. 1

S210: Determine a first emotion status of a first user, where the first emotion status is an emotion status of the first user at a first moment S220: Predict a second emotion status based on the first emotion status and a first emotion prediction model, where the second emotion status is an emotion status of the first user at a second moment, and the second moment is later than the first moment S230: Output a response to the first user based on the second emotion status

FIG. 2

METHOD FOR PREDICTING EMOTION STATUS AND ROBOT

CROSS-REFERENCE TO RELATED APPLICATIONS

This application is a continuation of International Application No. PCT/CN2018/077151, filed on Feb. 24, 2018, which claims priority to Chinese Patent Application No. 201710107006.2, filed on Feb. 27, 2017. The disclosures of the aforementioned applications are hereby incorporated by reference in their entireties.

TECHNICAL FIELD

This application relates to the field of artificial intelligence, and more specifically, to a method for predicting an emotion status and a robot in the field of artificial intelligence.

BACKGROUND

As artificial intelligence develops continuously, a primary task of a new generation artificial intelligence system needs to have an emotion connection capability of "sensibility", so as to meet universal psychological and emotional needs in a manner similar to that of human beings, thereby gradually building trust and dependency. In other words, the artificial intelligence should not be just an ordinary intellectual tool. The artificial intelligence should not always develop in a rational direction, but should fall into a cross region of sensibility and rationality.

Emotion calculation plays a vital role in the development of artificial intelligence, and we also see more and more products with an "emotion". However, this is only a beginning, and facing the very complex problem of human emotion, the artificial intelligence still has a long way to go.

The prior art describes sensing of communication details by a robot, so as to output a voice and a response action; and after a second time of detecting details about communication with a person, outputting, by the robot, at least two expressions as compared with an action or an expression of one aspect output at a first time.

However, in the prior art, after sensing the communication details of an interaction object, the robot calculates an emotion status of a current moment by using an intelligence engine, and obtains an appropriate interaction manner and content through adaptation, and cannot predict an emotion status of the interaction object at a next moment.

To enhance user experience, a method for predicting the emotion status of the interaction object at the next moment is urgently needed in the field of artificial intelligence.

SUMMARY

Embodiments of this application provide a method for predicting an emotion status and a robot, so as to predict an emotion status of an interaction object at a next moment, and further enhance user experience.

According to a first aspect, a method for predicting an emotion status is provided, where the method includes:
determining a first emotion status of a first user, where the first emotion status is an emotion status of the first user at a first moment;
predicting a second emotion status based on the first emotion status and a first emotion prediction model, where the second emotion status is an emotion status of the first user at a second moment, and the second moment is later than the first moment; and
outputting a response to the first user based on the second emotion status.

The method used in this embodiment of this application is used to predict an emotion status of a user at a next moment, and can provide a timely warning or a communication skill suggestion for both parties of a conversation, so as to further improve a person-to-person communication effect.

In some possible embodiments, the predicting a second emotion status based on the first emotion status and a first emotion prediction model includes:
determining the first emotion prediction model based on at least one of personalized factor information, conversation scenario information, and external environment information of the first user; and predicting the second emotion status based on the first emotion status and the first emotion prediction model.

In one embodiment, when the predicted user communicates with different persons, changes of the emotion status of the user are different. For example, when the predicted user communicates with some persons, for example, with a child, the user is gentle and pleased, and therefore, emotion status migration is relatively gentle, and the user has a low probability of being irritated or sad; however, when the predicted user communicates with some specific objects, the emotion status fluctuates greatly. In this embodiment of this application, information related to a second user is referred to as the conversation scenario information.

In addition, different external environments may also affect the emotion status of the predicted user. For example, emotion changes of the predicted user are different in a terrifying atmosphere and in a home environment. In this embodiment of this application, information that is not related to the second user and that is used by an emotion prediction module to construct an external environment scenario is referred to as the external environment information.

An embodiment of this application further introduces the personalized factor information, which is used to indicate personalized features of the predicted user, for example, a character of the predicted user. Specifically, there is a difference among stimulus of external things for different persons, duration of different persons in each emotion status, and spontaneous migration between different emotion statuses.

Therefore, in this embodiment of this application, the first emotion prediction model is determined by using the personalized factor information, the conversation scenario information, and the external environment information of the first user. This effectively increases accuracy of the emotion status of the user at a future moment predicted by the first emotion prediction module based on a current user emotion status.

In some possible embodiments, the determining the first emotion prediction model based on at least one of personalized factor information, conversation scenario information, and external environment information of the first user includes:
determining a second emotion prediction model; and correcting the second emotion prediction model based on at least one of the personalized factor information, the conversation scenario information, and the external environment information of the first user, and determining a corrected second emotion prediction model as the first emotion prediction model.

In some possible embodiments, before the predicting a second emotion status based on the first emotion status and a first emotion prediction model, the method further includes:

training personality information of the first user based on a basic personality template library, to obtain the personalized factor information of the first user.

In some possible embodiments, before the determining a first emotion status of a first user, the method further includes:

obtaining at least one type of detection information of the first user by using at least one sensor at the first moment, where the determining a first emotion status of a first user includes:

generating a first emotion signal based on the at least one type of detection information and an emotion digital model; searching an emotion space database for a second emotion signal with a highest degree of matching with the first emotion signal, where the emotion space database includes at least one emotion signal, at least one emotion status, and a correspondence between the at least one emotion signal and the at least one emotion status; and determining an emotion status corresponding to the second emotion signal as the first emotion status.

In some possible embodiments, the determining a first emotion signal based on the at least one type of detection information and an emotion digital model includes:

determining a weight of each of the at least one type of detection information; generating the personal characteristic information of the first user based on the at least one type of detection information and the weight of each of the at least one type of detection information; and determining the first emotion signal based on the personal characteristic information and the emotion digital model.

Because the detection information obtained by different sensors has different effects in subsequent evaluation of the emotion status of the user at a current moment, this embodiment of this application effectively improves accuracy of evaluating the first emotion signal by using the weight of each type of detection information.

In some possible embodiments, the determining a weight of each of the at least one type of detection information includes:

determining the weight of each of the at least one type of detection information based on the personalized factor information of the first user.

In some possible embodiments, the determining a weight of each of the at least one type of detection information includes:

determining the weight of each of the at least one type of detection information based on information quality of each of the at least one type of detection data.

In some possible embodiments, if the first user rejects the response, the method further includes:

adjusting the first emotion prediction model, or adjusting the personalized factor information of the first user, or adjusting the first emotion prediction model and the personalized factor information of the first user.

In some possible embodiments, before the adjusting the first emotion prediction model, or adjusting the personalized factor information of the first user, or adjusting the first emotion prediction model and the personalized factor information of the first user, the method further includes:

obtaining at least one type of verification information by using the at least one sensor at the second moment, and determining a third emotion status of the first user based on the at least one type of verification information, where the adjusting the first emotion prediction model, or adjusting the personalized factor information of the first user, or adjusting the first emotion prediction model and the personalized factor information of the first user includes:

based on a degree of matching between the third emotion status and the second emotion status, adjusting the first emotion prediction model, or adjusting the personalized factor information of the first user, or adjusting the first emotion prediction model and the personalized factor information of the first user.

According to a second aspect, a robot is provided, where the robot includes:

a processing unit, where the processing unit is configured to:

determine a first emotion status of a first user, where the first emotion status is an emotion status of the first user at a first moment; and predict a second emotion status based on the first emotion status and a first emotion prediction model, where the second emotion status is an emotion status of the first user at a second moment, and the second moment is later than the first moment; and an output unit, where the output unit is configured to output a response to the first user based on the second emotion status.

According to a third aspect, a robot is provided, where the robot includes:

a processor, where the processing unit is configured to:

determine a first emotion status of a first user, where the first emotion status is an emotion status of the first user at a first moment; and predict a second emotion status based on the first emotion status and a first emotion prediction model, where the second emotion status is an emotion status of the first user at a second moment, and the second moment is later than the first moment; and a transceiver, where the output unit is configured to output a response to the first user based on the second emotion status.

According to a fourth aspect, a robot is provided, where the robot includes:

a touch display screen, configured to display graphic image information to a care object and receive a touch control signal of a user; a loudspeaker module, configured to provide a sound output signal for a cared object; a microphone array and a sensor group, configured to detect features such as a sound, an expression, and behavior of the cared object; a start/pause/emergency button, configured to provide a simple operation instruction and respond to an interrupt instruction of the user in an emergency situation for the cared object; a processing and operation module, configured to: calculate and output a control instruction of a companion robot based on a user status signal input by the microphone array and the sensor group, the user operation instruction of the button, guardian request information of a cared child from a network, a service instruction of a child care service institution from the network, third-party network cloud service data, and the like, and output the sound, an image, a body action and movement, and the like by the companion robot.

In some possible embodiments, the robot may further include: a track/wheel mobile mechanical apparatus, a mechanical arm.

According to a fifth aspect, a processing and operation module is provided, where the processing and operation module includes:

a main board and peripheral functional components, where the main board may include: a communications module, an I/O module, a processing module, an audio/video coding module, a motor servo control module, a touch display control module; and the peripheral functional components may include: a sensor module, a button, a microphone array, a touch display screen, an antenna, a power amplifier, a loudspeaker, a motor and an encoder, and a track/wheel mobile mechanical apparatus.

The sensor module and the button are separately connected to the I/O module of the main board, the microphone array is connected to the audio/video coding/decoding module, the touch display controller receives touch control input of the touch display screen, and provides a display drive signal. The motor servo control module drives the motor and the encoder based on a program instruction to drive the track/wheel mobile mechanical apparatus to form movement of the robot, and the sound is output by the audio/video coding/decoding module and obtained from the loudspeaker driven by the power amplifier.

In some possible implementations, the main board may further include a processor and a memory. In addition to recording a robot algorithm and an execution program and a configuration file of the robot, the memory includes an audio and video file, an image file, and the like that are required when the robot performs nursing work, and further includes some temporary files during program running.

In some possible embodiments, the main board further includes a communications module, configured to provide a communication function between the robot and an external network, for example, short range communication such as a Bluetooth and a Wireless Fidelity module.

In some possible embodiments, the main board may further include a power management module, and the power management module implements battery charging and discharging and energy saving management of the device by using a connected power system.

The robot can perform the method described above.

In one embodiment, the at least one sensor includes:
a sound sensor, an image sensor, a location sensor, an acceleration sensor, a gyro sensor, a geomagnetic sensor, an infrared sensor, an electrocardiogram sensor, a pulse sensor, a skin current sensor, a perspiration sensor, and an electromyographic flow sensor.

In one embodiment, the conversation scenario information includes at least one of the following information:
the personalized factor information of a second user, information about a social relationship between the second user and the first user, and data about historical communication between the second user and the first user; where
the second user is one or more users in conversation with the first user.

In one embodiment, the external environment information includes at least one type of the following information:
weather information, geographical location information of the first user, the first moment, and the second moment.

In one embodiment, the first emotion prediction model is a Hidden Markov Model.

BRIEF DESCRIPTION OF DRAWINGS

FIG. 1 is a schematic diagram of an example scenario to which an embodiment of this application may be applied;

FIG. 2 is a schematic flowchart of a method for predicting an emotion status according to an embodiment of this application;

DESCRIPTION OF EMBODIMENTS

Figure 3:
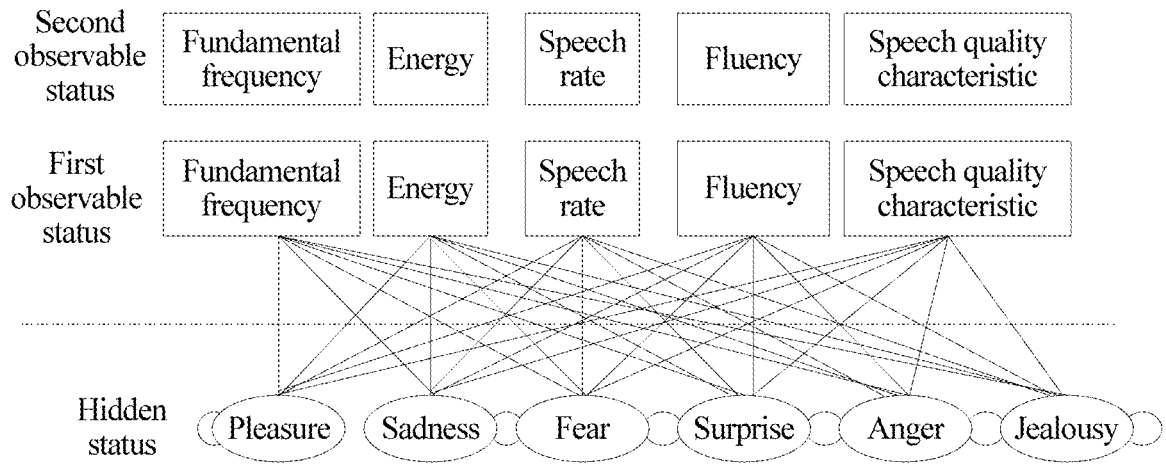
FIG. 3 is a schematic diagram of a method for predicting an emotion status based on the Hidden Markov Model according to an embodiment of this application.

The following describes the technical solutions in embodiments of this application with reference to the accompanying drawings.

Emotion is a subjective reflection of a human nervous system on an external value relationship, is experience of human beings on an objective thing, and plays an important role in rational behavior and rational decision-making. Emotion evaluation in the embodiments of this application refers to a capability of a computer system to identify a human emotion status at a current moment, or may be referred to as emotion identification. Emotion prediction refers to a capability of the computer system to identify the human emotion status at the current moment and predict the emotion status at a next moment based on the current emotion status.

From the point of view of physiology, the emotion status includes three factors: emotion status experience, emotion status expression and emotion status physiology. However, we actually do not need to understand the essence of human emotion, provided that a machine is enabled to analyze various signals of emotion expressions and output results. Just as although currently we cannot completely decipher the brain, we can still develop intelligent machines in terms of functionality.

A robot may obtain the foregoing signals by using a plurality of implementations.

For example, the robot may collect physiological signals of an object by using sensors, for example, breath, heart rate, body temperature, and skin resistance.

For another example, the robot may obtain the signals by detecting features such as a facial expression, a voice, and a gesture of the object by using the sensor.

Based on the foregoing perspective, the embodiments of this application provide a method for predicting the emotion status of a user at the next moment by using the robot. The method can adapt to a requirement of direct communication between different persons in different scenarios. Based on the predicted emotion status, a timely warning or a communication skill suggestion can be provided for both parties of a conversation to further improve a person-to-person communication effect.

In other words, according to the method for predicting an emotion status in the embodiments of this application, after an emotion status identification is performed on an emotion status at the current moment of a collection object, a prediction model is further required to predict the emotion status at a next moment, and a corresponding reminder or suggestion is provided to the user after the prediction, so as to improve the communication effect.

For example, the robot can know in advance what time a patient is sick, so as to provide a mitigation method in advance.

It should be understood that the method for predicting an emotion status and the robot in the embodiments of this application are applicable to any scenario, for example, a cell, a street, an administrative region, a province, a country, a multinational, or even a global.

FIG. 1 is a schematic block diagram of an example of a system architecture 100 according to an embodiment of this application.

As shown in FIG. 1, the system architecture 100 includes the following units:

a family or child care institution 110, which may include at least one cared child 112, a companion robot 111, and at least one indoor radio access network 113; a legal guardian (a parent, an immediate family member, or the like) 114 of the cared child, and an intelligent terminal 115 carried by the legal guardian; and an outdoor radio access network 116 that provides a remote radio network access service for the intelligent terminal 115;

a child care service institution 120, used to provide professional data services for child care services, including a child growth cloud server 121, a child growth model library 122, and a child care knowledge base 123;

a social public service institution 130, used to provide the child care services with cloud data published by a government, including but not limited to a weather forecast, a list of medical service institutions, epidemic information, an emergency notification, and the like; where the social public service institution 130 may specifically include a social public service cloud server 131 and a social public service cloud database 132;

at least one third-party network institution 140, used to provide a subdivided professional network cloud service for the child care services, for example, instant messaging, social application of the child care services, online audio and video services, network shopping, payment and logistics tracking, community and medical institution evaluation and voting; where the at least one third-party network institution 140 specifically includes a third-party network service cloud server 141 and a third-party network service cloud database 142. The system architecture 100 further includes the Internet 150 that is provided by a network operator for providing a network service.

The following describes implementations of predicting an emotion status according to the embodiments of this application with reference to FIG. 2 to FIG. 5.

FIG. 2 is a schematic flowchart of a method 200 for predicting an emotion status according to an embodiment of this application.

As shown in FIG. 2, the method 200 includes:

S210: Determine a first emotion status of a first user, where the first emotion status is an emotion status of the first user at a first moment.

Specifically, a robot determines the emotion status at the first moment.

In one embodiment, the robot obtains at least one type of detection information of the first user by using at least one sensor at the first moment; generates a first emotion signal based on the detection information and an emotion digital model; searches an emotion space database for a second emotion signal with a highest degree of matching with the first emotion signal, where the emotion space database may include at least one emotion signal, at least one emotion status, and a correspondence between the at least one emotion signal and the at least one emotion status; and determines an emotion status corresponding to the second emotion signal as the first emotion status.

In one embodiment, the robot first obtains the at least one type of detection information of the first user at the first moment by using the at least one sensor; and then generates the first emotion signal by using the detection information; and then searches the emotion database for the second emotion signal with a highest degree of matching with the first emotion signal, where the emotion space database includes a correspondence between an emotion signal and an emotion status; and finally determines an emotion status corresponding to the second emotion signal as the first emotion status.

It should be noted that the sensor in this embodiment of this application may be any device or apparatus capable of collecting a signal used to indicate a user emotion status. Specifically, the sensor may be a device or apparatus configured to collect body languages such as a voice, a facial expression, a gesture, and a standing posture, and physiological indicators such as a pulse and skin electricity, and these physiological indicators are digital expression of an emotion status, or may be referred to as emotion signals.

For example, the device or apparatus may be a sound sensor, an image sensor, a location sensor, an acceleration sensor, a gyro sensor, a geomagnetic sensor, an infrared sensor, an electrocardiogram sensor, a pulse sensor, a skin current sensor, a perspiration sensor, and an electromyographic flow sensor.

The skin current sensor can measure a conductive coefficient of skin in real time, and can measure tension of the user based on a change of the conductivity coefficient. The pulse pressure sensor can monitor a change of pulse pressure caused by a cardiac change at all times. The perspiration sensor is a strip that can monitor a relationship between breath and perspiration at all times based on a change of expansion and contraction. The electromyographic flow sensor can measure a weak voltage during muscle motion.

For another example, a microphone used for voice identification, a camera used for expression identification, a gyroscope, the infrared sensor, the electrocardiogram sensor, and the like that are used for location and motion identification can sense specified measured parameters (a physical parameter, a chemical parameter, a status parameter, and a mechanical parameter), and the parameters can be converted based on specified laws, into available signals for outputting by a plurality of information obtaining sensors.

It should also be noted that the foregoing mentioned sensors are merely used as examples for description and should not limit the actual protection scope of the embodiments of this application.

In one embodiment, the robot extracts information that can express or identify emotion features from the information obtained by different sensors, such as sound, a facial image, eye iris information, and electromyographic information. The robot identifies the information obtained by different sensors, and generates the first emotion signal; searches the emotion space database for the second emotion signal with a highest degree of matching with the first emotion signal; and determines an emotion status corresponding to the second emotion signal as the first emotion status.

The following describes a specific implementation of determining the first emotion signal in this embodiment of this application.

Because detection information obtained by different sensors has different effects in subsequent evaluation of the emotion status of the user at a current moment, this embodiment of this application provides a concept of a sensor weight.

In one embodiment, when determining the first emotion signal of the first user, the robot may determine a weight of each of the at least one type of detection information; generate personal characteristic information of the first user based on the detection information and the weight of each type of the detection information; and determine the first emotion signal based on the personal characteristic information and the emotion digital model.

It should be understood that the personal characteristic information in this embodiment of this application refers to information that is related to the first user and that is used to indicate the emotion status, for example, may be used to indicate specific parameter information such as an expression, a physiological feature, and a physical feature of the first user, and specifically, may be body languages such as a voice, a facial expression, a gesture, and a standing posture of the first user, and physiological indicators such as a pulse and skin electricity.

Optionally, in an embodiment, the weight of each of the at least one type of detection information is determined based on personalized factor information of the first user.

Specifically, the personal characteristic information may be obtained based on information of a personalized factor library of a predicted user. For example, a change in a sound signal of a user can best reflect a basic emotion status of the user, and therefore, in a plurality of types of sensor information obtained by the sensor, a relatively large weight is assigned to the information obtained by the sound sensor.

It should be understood that the robot may determine the weight of the foregoing detection information by using the personalized factor library of the predicted user, or may determine the weight of the foregoing detection information in another manner. This is not specifically limited in this embodiment of this application.

For example, in some cases, for the user, although a sensor, such as the sound sensor, has a relatively large weight, the information obtained by the sound sensor is insufficient. In this case, the weight of the sensor needs to be adjusted properly, and a weight of a sensor that obtains more predicted user data is increased.

In other words, the robot can determine the weight of each type of the detection information based on information quality of each of the at least one type of detection data.

It should be understood that, in this embodiment of this application, learning of the foregoing sensor weight may also be optimized.

For example, an initial value of the weight may be set based on historical data in the personalized factor library of the predicted user, and then the weight is continuously optimized based on a neural network learning method.

For another example, when the emotion status of the current predicted user is estimated based on sensor data, selection may alternatively be performed based on a result obtained by both a single sensor through evaluation and a result obtained by all sensors through evaluation, so as to improve accuracy of the evaluation.

It should be noted that the emotion space database in this embodiment of this application may be a database formed by collecting basic emotion statuses, and is used to describe basic emotions of a person and changes of the emotions. The emotion space database may be obtained through training and recording, and optionally, an existing training manner is used.

For example, in one embodiment of this application, the basic emotion status of the user may be classified into pleasure, sadness, fear, surprise, anger, and jealousy. The six basic emotion statuses can also be combined with each other to derive a variety of complex emotion statuses, such as depression, tension, and anxiety. In the prior art, the foregoing six basic emotion statuses can be accurately estimated by using a robot. Each basic emotion status has a corresponding model. It is assumed that after training and recording, the emotion space database formed by the foregoing basic emotion status set is obtained.

When determining the second emotion signal of the first user, the robot may perform signal processing on the predicted at least one type of detection information, combine the predicted at least one type of detection information with the sensor information to generate the first emotion signal, and then perform matching between the first emotion signal and an emotion signal in the known emotion space database, so as to obtain the second emotion signal with a highest degree of matching with the current emotion signal of the first user.

Because characteristics of the basic emotion status of each user are different, each subtle emotion status of the user can be sensed and interpreted with the sensor data.

To improve accuracy of the first emotion status in this embodiment of this application, optionally, the basic emotion status in the emotion space database may continue to be enriched based on research and exploration in the academic world. That is, the foregoing six basic emotion statuses are merely examples used for description.

S220: Predict a second emotion status based on the first emotion status and a first emotion prediction model, where the second emotion status is an emotion status of the first user at a second moment, and the second moment is later than the first moment.

In one embodiment, after obtaining the first emotion status of the first user through evaluation, the robot predicts the emotion status of the first user at the second moment based on the first emotion status and the first emotion prediction model.

That is, after the current emotion status of the first user is identified, a prediction model is further required, and the robot can provide a corresponding reminder or suggestion for the first user by predicting the emotion status of the first user at a next moment, so as to improve a communication effect.

The emotion prediction model is used for emotion prediction, and is a prediction of a future emotion status of a specific user, or may be referred to as an emotion status prediction model, an emotion migration matrix, and the like.

In an embodiment, the robot may determine the first emotion prediction model based on at least one of the personalized factor information, conversation scenario information, and external environment information of the first user; and predict the second emotion status based on the first emotion status and the first emotion prediction model.

In one embodiment, when the predicted user communicates with different persons, changes of the emotion status of the user are different. For example, when the predicted user communicates with some persons, for example, with a child, he is gentle and pleased, and therefore, emotion status migration is relatively gentle, and he has a low probability of being irritated or sad; however, when the predicted user communicates with some specific objects, the emotion status fluctuates greatly. In this embodiment of this application, information related to a second user is referred to as the conversation scenario information.

In one embodiment, the conversation scenario information may include at least one of the following information: the personalized factor information of the second user, information about a social relationship between the second user and the first user, and data about historical communication between the second user and the first user, where the second user is one or more users in conversation with the first user.

In addition, different external environments may also affect the emotion status of the predicted user. For example, emotion changes of the predicted user are different in a terrifying atmosphere and in a home environment. In this embodiment of this application, information that is not related to the second user and that is used by an emotion prediction module to construct an external environment scenario is referred to as the external environment information.

In one embodiment, the external environment information may be information that is used to extract representative environment characteristics from the detection information obtained by the sensor. For example, the external environment information may include at least one type of the following information: weather information, geographical location information of the first user, the first moment, and the second moment.

An embodiment of this application further introduces the personalized factor information, which is used to indicate personalized features of the predicted user, for example, a character of the predicted user. Specifically, there is a difference among stimulus of external things for different persons, duration of different persons in each emotion status, and spontaneous migration between different emotion statuses. Optionally, the personalized factor of the first user may be used to train personality information of the first user based on a basic personality template library to obtain the personalized factor information of the first user.

The personalized factor library may be used to obtain personalized factors of different users through training and learning based on the existing mature basic personality template library that is being researched in the academic world, and the personalized factor library may be used to obtain, through simulation, an emotion status change law of different types of persons, so as to improve prediction accuracy.

Therefore, in one embodiment of this application, the emotion prediction model is determined by using the personalized factor information, the conversation scenario information, and the external environment information of the first user, thereby effectively increasing accuracy of the emotion status of the user at a future moment predicted by the emotion prediction module based on the current user emotion status.

It should be understood that specific content of the conversation scenario information and the external environment information is not limited in this embodiment of this application. That is, the conversation scenario information and the external environment information may be other information that can play a same role.

In another embodiment, the robot obtains a second emotion prediction model, corrects the second emotion prediction model based on at least one of the personalized factor information, the conversation scenario information, and the external environment information of the first user, and determines a corrected second emotion prediction model as the first emotion prediction model.

Specifically, when the robot does not obtain or does not obtain all the personalized factor information, the conversation scenario information, and the external environment information of the first user, the robot first determines the second emotion prediction model, and then finely adjusts and corrects the second emotion prediction model by using the detection information obtained by the sensor.

In one embodiment, the second prediction model is determined based on a first user type. The first user type is not specifically limited in this embodiment of this application.

For example, from a perspective of cultural sociology, persons can be divided into the following six types based on their ideas about a most valuable lifestyle: economic, theoretical, aesthetic, religious, power-oriented, and social.

Among them, economic persons are centered on economic views, and pursue wealth and gain benefits for personal life purposes. Most industrialists fall into this type. Theoretical persons explore essence of things as the highest value of human beings, but are often incapable of resolving practical problems. Philosophers and theorists are mostly of this type. The highest value in life of aesthetic persons is to feel beauty of things. They live for pursuing self-fulfillment and self-satisfaction, and do not care much about real life. Most artists fall into this type. Religious persons regard religion as the highest value of life, believe in supernatural power, firmly believe in eternal life, and take love for people and things as a standard of conduct. Theologians are typical representatives of this type of people. Power-oriented persons live for gaining power, have strong power consciousness and strong desire for power, and regard gaining power as the highest value. Most leaders fall into this type. The social persons pay sufficient attention to social values, take love for society and care about others as their goal of self-fulfillment, and dedicated to social public welfare. Most professional activists in fields such as culture, education, health, and social charity fall into this type.

For another example, from a perspective of the psychological field, according to stable psychological characteristics of human beings in terms of speech, behavior, and expression, temperaments of human beings fall into four types: sanguine temperament, phlegmatic temperament, choleric temperament, and melancholic temperament.

Among them, persons of sanguine temperament are lively and active, their emotion is quick but not lasting, they can think quickly, but they often make mistakes; and they are relatively frivolous and not practical. Persons of choleric temperament are energetic, have strong emotion, speak quickly, and are difficult to control; and they are brave, tough, and competitive in life, but they are always irritable and rough. Persons of phlegmatic temperament are quiet and calm, and move slowly and inactive, with a slow occurrence of emotion; and they are practical and careful. Persons of melancholic temperament are introverted and emotional, and think clearly, but they are timid, sensitive, and coward.

The robot selects the second emotion prediction model of the predicted user based on the classification by the foregoing two dimensions. Based on the second emotion prediction model, the robot may further finely adjust the second emotion prediction model based on the personalized factor information, the conversation scenario information, and the external environment information of the predicted user.

It should be noted that, in one embodiment of this application, the second emotion prediction model may be determined based on the first user type, or may be determined in another manner, and this is not specifically limited in this embodiment of this application.

Because the emotion status is a parameter that cannot be directly observed and that is hidden in a plurality of physiological and behavioral characteristics, it is difficult to model the emotion status. An emotion trend can be inferred only based on changes of an emotion probability of the user, specifically, qualitative and quantitative establishment of a theoretical model, an indicator system, a calculation method, and a measurement technology that are used to measure depth and strength of artificial emotion.

In one embodiment of this application, an example in which the Hidden Markov Model provided by The MIT Media Lab is used for description. It should be understood that the emotion prediction model is not specifically limited in this embodiment of this application. For example, the emotion prediction model may alternatively be a mathematical model of a Bayesian network mode.

FIG. 3 is a schematic diagram of a method for predicting an emotion status based on the Hidden Markov Model according to an embodiment of this application.

As shown in FIG. 3, it is assumed that the basic emotion status set of the first user is V={Happiness, sadness, fear, surprise, anger, jealousy}. If there are a plurality of pieces of observable status information, where herein the information obtained by the sound sensor is used as an example for description, a new Hidden Markov Model (HMM) needs to be obtained by a plurality of sensors by adding a weight and in an overlapping manner. S1={fundamental frequency, energy, speech rate, fluency, sound quality}. Based on the detected range information and the change trend of S1, an emotion status at a next moment of the user may be predicted according to environment information and a conversation environment.

By collecting statistics, it is found that a pleasure degree of the emotion status is significantly positively correlated with an average value, a maximum value and a range of the fundamental frequency, and an activation degree is positively correlated with a minimum value of the fundamental frequency. In one embodiment, the average value of the fundamental frequency of pleasure and anger is higher than that of another emotion status; a short-time energy of pleasure is enhanced, and the speech rate increases; the fundamental frequency in an angry status is increased most; a short-time energy average value of sadness is close to that of a calm status. In addition, a speech quality characteristic is also used to distinguish between different emotion statuses, and the speech quality characteristic can be an important reflection of the personalized factor.

In addition, because a recognition rate of an electromyographic signal of electromyography (electromyography, EMG) of the emotion status of the pleasure, the anger, and the sadness is very high, a second observable status, namely, the electromyographic signal, may be introduced based on a first observable status, namely, a sound, so as to correct the emotion status predicted by using the sound.

Likewise, another available sensor signal may further be introduced. Each sensor has its own expertise in detecting the emotion status of the feature, and a dependency ratio of each piece of sensor information in emotion status prediction can be adjusted by dynamically adjusting the weight. Different S sets of observable statuses are different.

In a specific mood, the user shows a specific emotion response, that is, an expression. Because the personality or personality information of different people affects a change range and a change rate of the emotion status, that is, within a specified time range, a change speed and a change degree of the emotion status are functions of a character, different persons have different HMM models. In one embodiment, the HMM model of the predicted user may be obtained through training and learning by using the prior art, and details are not described in this embodiment of this application.

S230: Output a response based on the second emotion status.

In one embodiment, the robot outputs a response message or a response action based on the second emotion status, so that the first user improves conversation efficiency by using the response message.

For example, the robot presents warning information to the first user, or sends an alert to the first user.

Although the method for predicting an emotion status in this embodiment of this application aims to improve prediction accuracy, in determining the prediction model, factors such as the personalized factor, ambient environment information and conversation information of the first user are introduced; however, a variety of deviations may not be avoided during emotion prediction.

Therefore, in this embodiment of this application, to further improve the accuracy of emotion status prediction.

In one embodiment, at least one type of verification information is obtained by using the at least one sensor at the second moment; a third emotion status of the first user is determined based on the verification information; and the first emotion prediction model and/or the personalized factor information of the first user is adjusted based on a degree of matching between the third emotion status and the second emotion status.

In other words, after predicting the emotion status at the next moment of the predicted user, the robot compares the emotion status with a true user emotion status of the predicted user at the next moment. If a matching degree meets a specific range requirement, the emotion status is added to a history learning library as a positive incentive; or if a matching degree does not meet a specific range requirement, the emotion status is used as a negative incentive, and a selection of a sensor factor and the emotion status prediction model is adjusted based on deviation of the matching degree. In addition, the robot may predict, based on an algorithm, whether a warning suggestion proposed by the algorithm is accepted by the user to perform a closed-loop iteration optimization for deviation.

According to the method for predicting an emotion status in this embodiment of this application, based on the emotion status at the current moment obtained by the single sensor and the sensor information through evaluation, the personalized factor of the predicted emotion status user and the factors such as the ambient environment information and the conversation information can be considered, so as to effectively improve evaluation accuracy of the current emotion status and the prediction accuracy of the emotion status at the next moment can be effectively improved, thereby helping the conversation user adjust communication details in time to improve communication efficiency.

Figure 4:
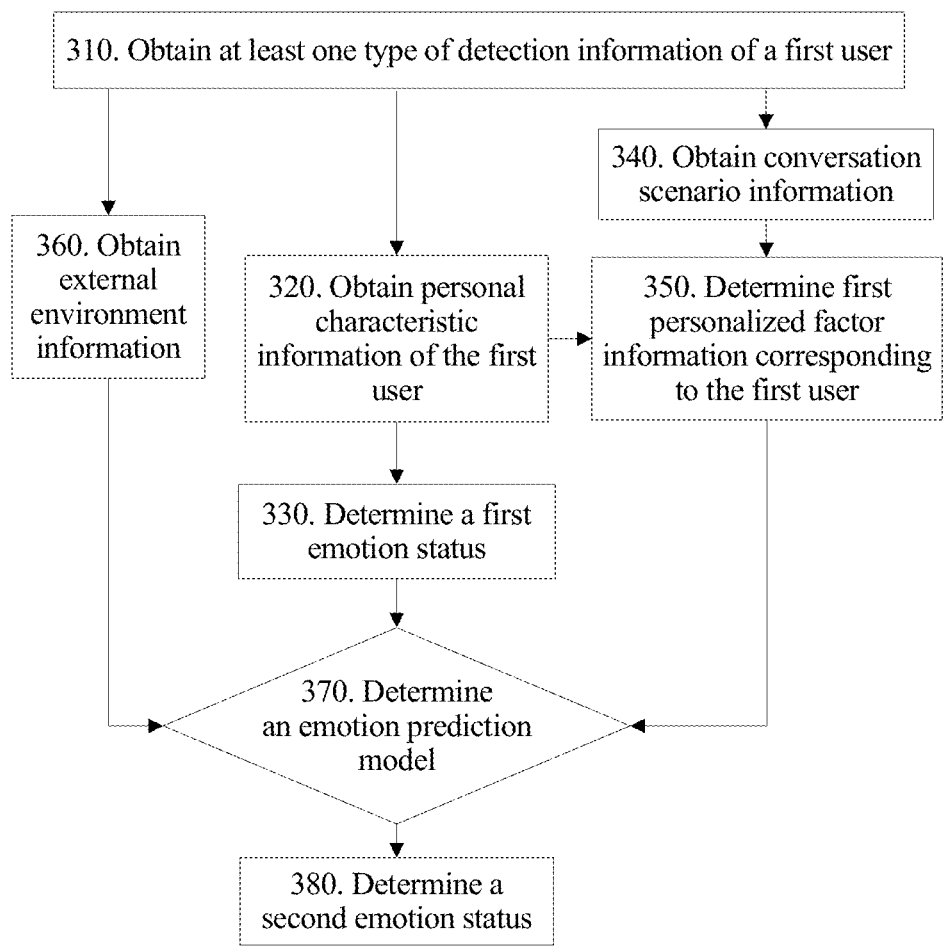
FIG. 4 is another schematic flowchart of a method for predicting an emotion status according to an embodiment of this application.

FIG. 4 is a schematic flowchart of a method 300 for predicting an emotion status according to an embodiment of this application.

As shown in FIG. 4, the method 300 includes:

310. Obtain at least one type of detection information of a first user.

In one embodiment, a robot obtains the at least one type of detection information of the first user at a first moment by using at least one sensor.

320. Obtain personal characteristic information of the first user.

In one embodiment, the robot extracts the personal characteristic information of the first user from the foregoing obtained detection information, where the personal characteristic information may be specific parameter information used to indicate an expression, a physiological feature, a physical feature, and the like of the first user, for example, body languages such as a voice, a facial expression, a gesture, a standing posture, and physiological indicators such as a pulse and skin electricity.

330. Determine a first emotion status.

In one embodiment, the robot evaluates the emotion status of the first user at the first moment based on the determined personal characteristic information.

340. Obtain conversation scenario information.

In one embodiment, the robot obtains the conversation scenario information. The conversation scenario information may include at least one of the following information: the personalized factor information of a second user, information about a social relationship between the second user and the first user, and data about historical communication between the second user and the first user, where the second user is one or more users in conversation with the first user.

350. Determine first personalized factor information corresponding to the first user.

In one embodiment, the robot determines the first personalized factor information corresponding to the first user. For example, the robot can train personality information of the first user based on a basic personality template library, to obtain the personalized factor information of the first user. Optionally, in this embodiment of this application, the first personalized factor information corresponding to the first user may further be corrected or finely adjusted based on the obtained personal characteristic information and/or the conversation scenario information of the first user.

360. Obtain external environment information.

In one embodiment, the robot obtains the external environment information, which is used to indicate a scenario factor independent of the second user. For example, the external environment information may include at least one type of the following information: weather information, geographical location information of the first user, the first moment, and the second moment.

370. Determine an emotion prediction model. Specifically, the robot determines the emotion prediction model based on the personalized factor information, the conversation scenario information, and the external environment information of the first user.

380. Determine a second emotion status.

In one embodiment, after obtaining the first emotion status of the first user through evaluation, the robot predicts the emotion status of the first user at the second moment based on the first emotion status and the emotion prediction model.

It should be understood that FIG. 4 is merely a description example of the method for predicting an emotion according to an embodiment of this application. This embodiment of this application is not limited thereto. For example, sequence numbers of the foregoing processes do not mean execution sequences. The execution sequences of the processes should be determined according to functions and internal logic of the processes, and should not constitute any limitation on the implementation processes of the embodiments of this application. For example, 320, 340, and 360 may be simultaneously performed.

Figure 5:
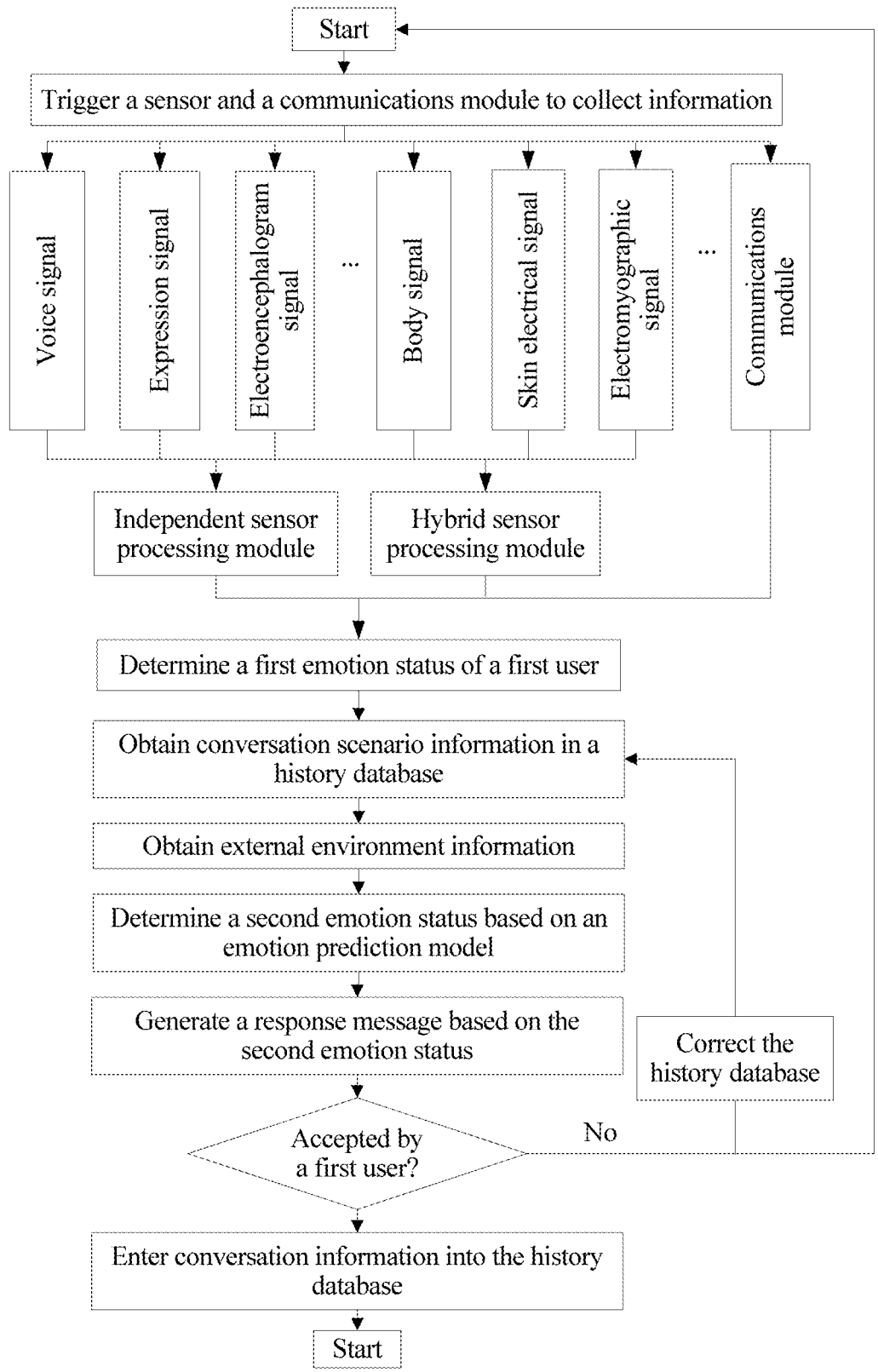
FIG. 5 is still another schematic flowchart of a method for predicting an emotion status according to an embodiment of this application.

FIG. 5 is another schematic flowchart of a method for predicting an emotion status according to an embodiment of this application.

As shown in FIG. 5, the robot triggers a sensor and a communications module to collect information, where the information may include at least one of the following information of the first user: a voice signal, an expression signal, an electroencephalogram signal, a body signal, a skin electrical signal, an electromyographic signal, and a signal collected by the communications module; the robot sends the signal collected by the sensor to an independent sensor processing module and/or a hybrid sensor processing module for signal processing, and determines the first emotion status of the first user, where the first emotion status is an emotion status of the first user at a current moment; the robot obtains the conversation scenario information and the external environment information in a history database, and determines the emotion prediction model based on the conversation scenario information and the external environment information; then, the robot predicts the second emotion status based on the emotion prediction model, where the second emotion status is an emotion status of the first user at a next moment; and the robot generates a response message based on the second emotion status, and performs the closed-loop iterative optimization of deviation based on whether a warning suggestion provided for the first user is accepted by the user. For example, if the first user accepts the warning suggestion, the second emotion status is added to a historical learning library as a positive incentive. If the first user rejects the warning suggestion, the second emotion status is used as a negative incentive to correct the history database, for example, to correct the conversation scenario information in the history database.

It should be understood that FIG. 5 is merely a description example of the method for predicting an emotion according to an embodiment of this application. This embodiment of this application is not limited thereto. For example, when determining the emotion prediction model, the personalized factor of the first user may further be considered.

It should also be understood that the terms used in the embodiments of this application and the appended claims are merely used for describing specific embodiments, and are not intended to limit the embodiments of this application.

For example, the term "and/or" in the embodiments of this application is merely an association relationship for describing associated objects and represents that three relationships may exist. Specifically, A and/or B may represent the following three cases: only A exists, both A and B exist, and only B exists. In addition, the character "/" in this specification generally indicates an "or" relationship between the associated objects.

For another example, the terms "a", "said" and "the" of singular forms used in the embodiments and the appended claims of this application are also intended to include plural forms, unless another meaning is clearly specified in a context.

For still another example, terms "first", "second", and the like may be used in the embodiments of this application to describe a variety of messages, but these messages are not limited by the terms. These terms are merely used to distinguish between the messages. For example, without departing from a scope of the embodiments of this application, the first emotion status may also be referred to as the second emotion status, and similarly, the second emotion status may also be referred to as the first emotion status.

For another example, depending on the context, for example, the word "if" used herein may be explained as "while" or "when" or "in response to determining" or "in response to detection".

The foregoing has described implementation of the method for predicting an emotion status in the embodiments of this application. The following describes the robot in the embodiments of this application with reference to the accompanying drawings.

Figure 6:
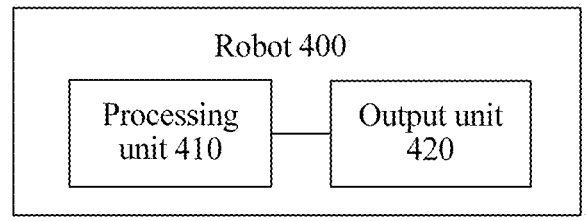
FIG. 6 is a schematic block diagram of a robot according to an embodiment of this application.

FIG. 6 is a schematic block diagram of a robot 400 according to an embodiment of this application.

As shown in FIG. 6, the robot 400 includes:

a processing unit 410, where the processing unit 410 is configured to:

determine a first emotion status of a first user, where the first emotion status is an emotion status of the first user at a first moment; and predict a second emotion status based on the first emotion status and a first emotion prediction model, where the second emotion status is an emotion status of the first user at a second moment, and the second moment is later than the first moment; and an output unit 420, where the output unit 420 is configured to output a response to the first user based on the second emotion status.

In one embodiment, the processing unit 410 is configured to:

determine the first emotion prediction model based on at least one of personalized factor information, conversation scenario information, and external environment information of the first user; and predict the second emotion status based on the first emotion status and the first emotion prediction model.

In one embodiment, the processing unit 410 is configured to:

determine a second emotion prediction model; and correct the second emotion prediction model based on at least one of the personalized factor information, the conversation scenario information, and the external environment information of the first user, and determine a corrected second emotion prediction model as the first emotion prediction model.

In one embodiment, before the processing unit 410 is configured to predict the second emotion status based on the first emotion status and the first emotion prediction model, the processing unit 410 is further configured to:

train personality information of the first user based on a basic personality template library, to obtain the personalized factor information of the first user.

In one embodiment, before the processing unit 410 determines the first emotion status of the first user, the robot further includes:

an obtaining unit, configured to obtain at least one type of detection information of the first user by using at least one sensor, where the processing unit 410 is specifically configured to:

generate a first emotion signal based on the at least one type of detection information and an emotion digital model; search an emotion space database for a second emotion signal with a highest degree of matching with the first emotion signal, where the emotion space database includes at least one emotion signal, at least one emotion status, and a correspondence between the at least one emotion signal and the at least one emotion status; and determine an emotion status corresponding to the second emotion signal as the first emotion status.

In one embodiment, the processing unit 410 is configured to:

determine a weight of each of the at least one type of detection information; and generate personal characteristic information of the first user based on the at least one type of detection information and the weight of each of the at least one type of detection information; and determine the first emotion signal based on the personal characteristic information and the emotion digital model.

In one embodiment, the processing unit 410 is configured to:

determine the weight of each of the at least one type of detection information based on the personalized factor information of the first user.

In one embodiment, the processing unit 410 is configured to:

determine the weight of each of the at least one type of detection information based on information quality of each of the at least one type of detection data.

In one embodiment, the processing unit 410 is further configured to:

if the first user rejects the response, adjust the first emotion prediction model and/or the personalized factor information of the first user.

In one embodiment, before the processing unit 410 is configured to adjust the first emotion prediction model and/or the personalized factor information of the first user, the processing unit 410 is further configured to:

obtain at least one type of verification information by using the at least one sensor, and determine a third emotion status of the first user based on the at least one type of verification information, where the processing unit 410 is specifically configured to:

adjust the first emotion prediction model and/or the personalized factor information of the first user based on a degree of matching between the third emotion status and the second emotion status.

In one embodiment, the at least one sensor includes:

a sound sensor, an image sensor, a location sensor, an acceleration sensor, a gyro sensor, a geomagnetic sensor, an infrared sensor, an electrocardiogram sensor, a pulse sensor, a skin current sensor, a perspiration sensor, and an electromyographic flow sensor.

In one embodiment, the conversation scenario information includes at least one of the following information:

the personalized factor information of a second user, information about a social relationship between the second user and the first user, and data about historical communication between the second user and the first user, where the second user is one or more users in conversation with the first user.

In one embodiment, the external environment information includes at least one of the following information:

weather information, geographical location information of the first user, the first moment, and the second moment.

In one embodiment, the first emotion prediction model is a Hidden Markov Model.

Figure 7:
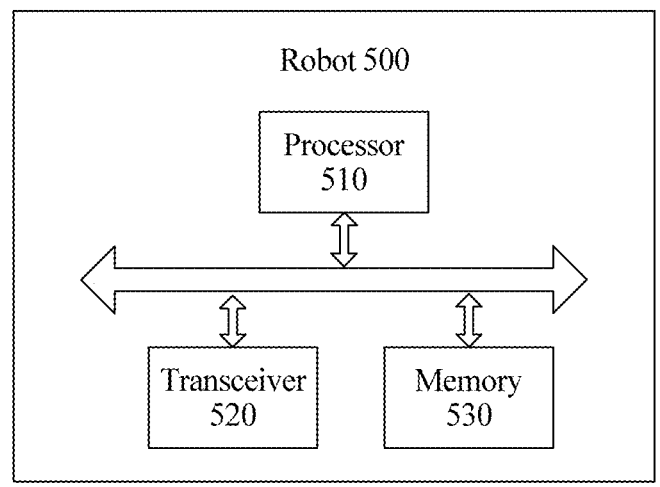
FIG. 7 is another schematic block diagram of a robot according to an embodiment of this application.

It should be noted that, in one embodiment of this application, the processing unit 410 may be implemented by a processor, and the output unit 420 may be implemented by a transceiver. As shown in FIG. 7, a robot 500 may include a processor 510, a transceiver 520, and a memory 530. The memory 530 may be configured to store the detection information, the emotion status information, and the like, and may further be configured to store code, an instruction, and the like that are executed by the processor 510. Components in the robot 500 are connected by using a bus system, where the bus system includes a power bus, a control bus, and a status signal bus in addition to a data bus.

The robot 500 shown in FIG. 7 can implement the processes implemented in the embodiments of FIG. 2 to FIG. 5 described above. To avoid repetition, details are not described herein again.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

In an embodiment, the robot in this embodiment of this application may be a product form of a cartoon image. For example, as shown in FIG. 8, the robot 600 specifically includes:

a touch display screen 601, configured to display graphic image information to a care object and receive a touch control signal of a user; a loudspeaker module 607, configured to provide a sound output signal for a cared object; a microphone array and a sensor group 602, configured to detect features such as a sound, an expression, and behavior of the cared object; a start/pause/emergency button 603, configured to provide a simple operation instruction and respond to an interrupt instruction of the user in an emergency situation for the cared object; and a processing and operation module 604, configured to: calculate and output a control instruction of a companion robot based on a user status signal input by the microphone array and the sensor group 602, the user operation instruction of the button 603, guardian request information of a cared child from a network, a service instruction of a child care service institution from the network, third-party network cloud service data, and the like, and output the sound, an image, a body action and movement, and the like by the companion robot.

In one embodiment, the robot 600 may further include: a track/wheel mobile mechanical apparatus 605 and/or a mechanical arm 606.

Figure 8:
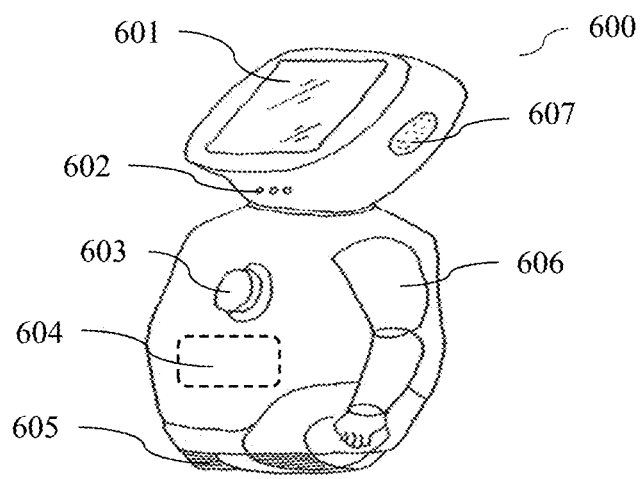
FIG. 8 is still another schematic block diagram of a robot according to an embodiment of this application.

It should be understood that FIG. 8 is merely a description example, and this embodiment of this application is not limited thereto. That is, in addition to the foregoing companion robot of the cartoon image, the robot may also be designed into other forms based on requirements of different people. For example, in an education scenario, the robot can be designed and integrated into a teaching system, the robot used by a parent can be designed and integrated into an ordinary watch, a mobile phone, and the like.

Figure 9:
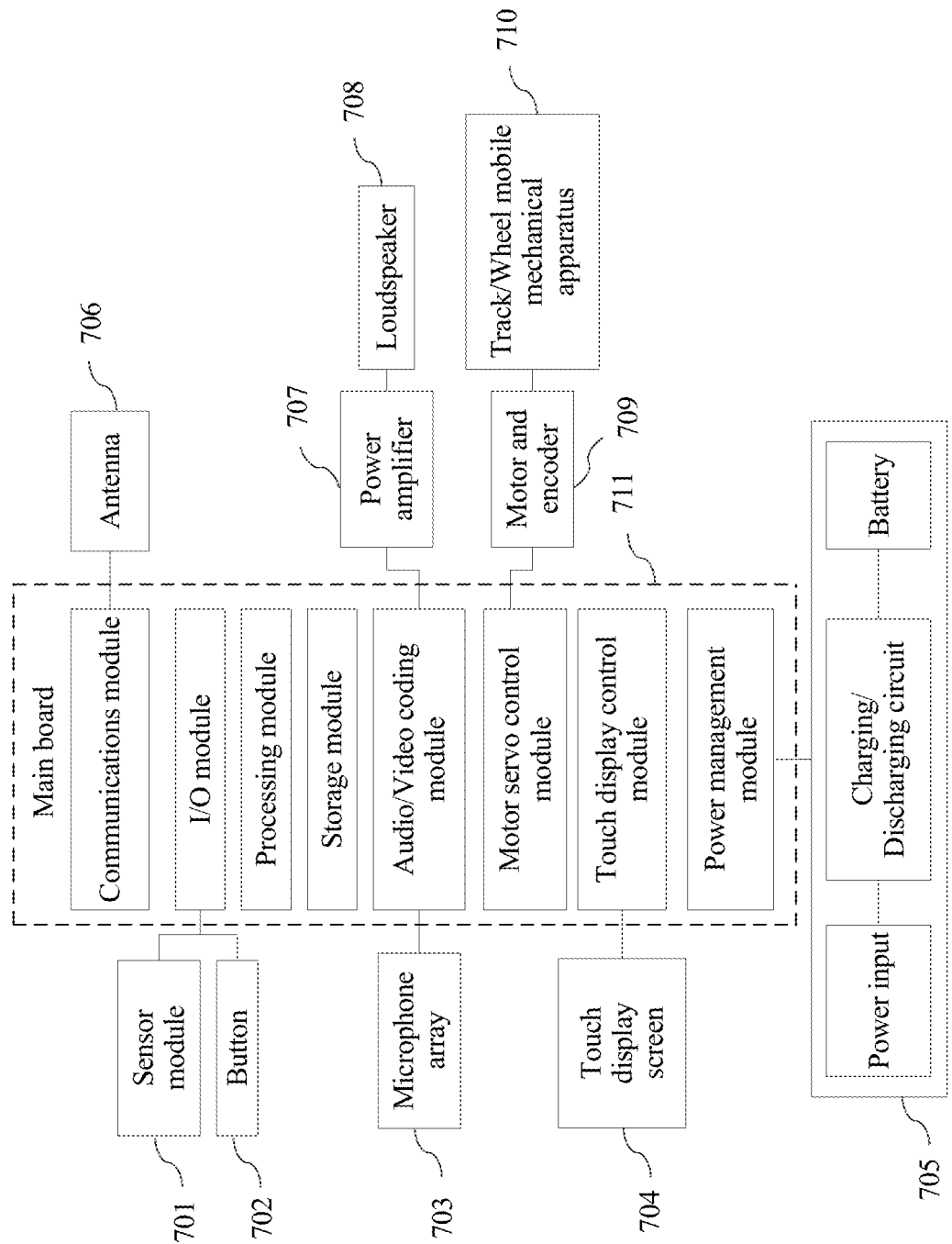
FIG. 9 is still another schematic block diagram of a robot according to an embodiment of this application.

FIG. 9 is an example of a block diagram of a processing and operation module 700 according to an embodiment of this application.

As shown in FIG. 9, the processing and operation module 700 may include:

a main board 711 and peripheral functional components, where the main board 711 may include: a communications module, an I/O module, a processing module, an audio/video coding module, a motor servo control module, and a touch display control module; and the peripheral functional components may include: a sensor module 701, a button 702, a microphone array 703, a touch display screen 704, an antenna 706, a power amplifier 707, a loudspeaker 708, a motor and an encoder 709, and a track/wheel mobile mechanical apparatus 710.

The sensor module 701 and the button 702 are separately connected to the I/O module of the main board 711. The microphone array 703 is connected to the audio/video coding/decoding module of the main board 711. The touch display control module of the main board 711 receives touch control input of the touch display screen 704, and provides a display drive signal. The motor servo control module drives the motor and the encoder 709 based on a program instruction to drive the track/wheel mobile mechanical apparatus 710 to form movement of the robot, and the sound is output by the audio/video coding/decoding module and obtained from the loudspeaker 708 driven by the power amplifier 707.

In one embodiment, the processing and operation module 700 may further include a processor and a memory that are on the main board 711. In addition to recording a robot algorithm and an execution program and a configuration file of the robot, the memory includes an audio and video file, an image file, and the like that are required when the robot performs nursing work, and further includes some temporary files during program running.

In one embodiment, the processing and operation module 700 may further include the communications module on the main board 711, configured to provide a communication function between the robot and an external network.

For example, the communications module may be a short range communications module such as a Bluetooth module or a Wireless Fidelity module.

In one embodiment, the main board 711 may further include a power management module, and the power management module implements battery charging and discharging and energy saving management of the device by using a connected power system 705.

It should be understood that the processing and operation modules in this embodiment of this application are not limited to the structural block diagram shown in FIG. 9. For example, the motor servo control module may further drive the motor and the encoder 709 based on the program instruction to drive the mechanical arm 606 shown in FIG. 8 to form a body language of the robot.

Figure 10:
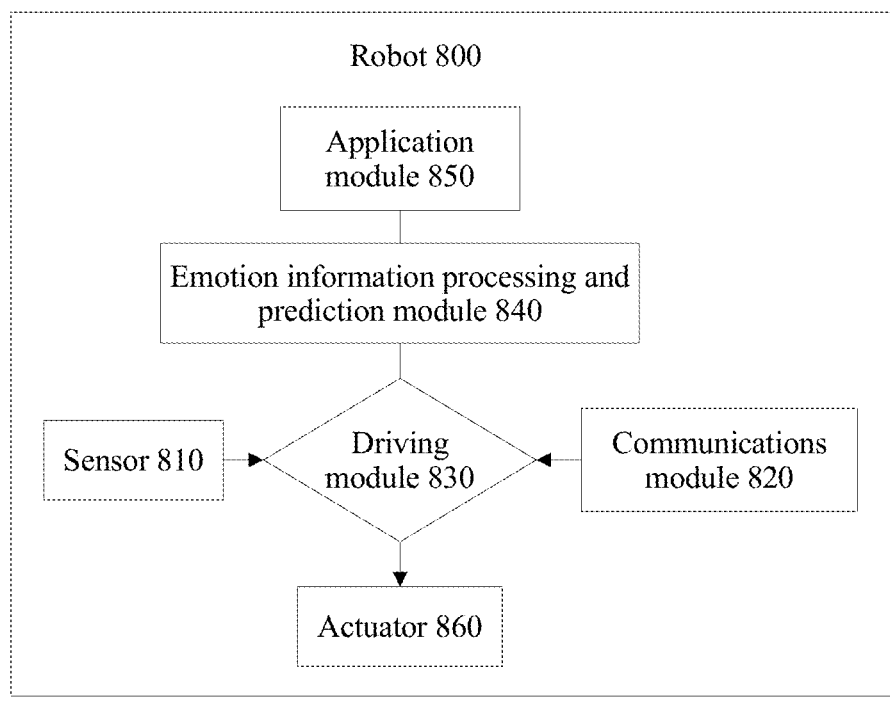
FIG. 10 is still another schematic block diagram of a robot according to an embodiment of this application.

In another embodiment, a block diagram of the robot in this embodiment of this application may be shown in FIG. 10.

As shown in FIG. 10, the robot 800 includes: a sensor 810, a communications module 820, a driving module 830, an emotion information processing and prediction module 840, an application module 850, and an actuator 860.

The emotion information processing and prediction module 840 is a core component of this embodiment of this application. The module 840 processes and obtains emotion information of the user based on the external environment information and the user information obtained by the bottom-layer sensor 810, the communications module 820, and the like. After being obtained, the emotion information of the user is provided for the upper-layer application module 850 for invocation, and the upper-layer application module 850 may provide application data of the user to assist the module 840 to better predict and sense the emotion of the user.

It should be understood that FIG. 6 to FIG. 10 are merely description examples of the block diagram of the robot according to an embodiment of this application. This embodiment of this application is not limited thereto.

It may be clearly understood by a person skilled in the art that, for the purpose of convenient and brief description, for a detailed working process of the system, apparatus, and unit, refer to a corresponding process in the method embodiments. Details are not described herein again.

In embodiments of this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the embodiments of this application.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in the embodiments of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the embodiments of this application shall be subject to the protection scope of the claims.

What is claimed is:

1. A method for predicting an emotion status by a robot, wherein the method comprises:
    obtaining, by a processor of the robot, at least one type of detection information of a first user by using at least one sensor at a first moment;
    determining, by the processor of the robot, a first emotion status of the first user based on a weight of each of the at least one type of detection information, wherein the first emotion status is an emotion status of the first user at the first moment;
    predicting, by the processor of the robot, a second emotion status based on the first emotion status and a first emotion prediction model, wherein the second emotion status is an emotion status of the first user at a second moment, and the second moment is later than the first moment;
    outputting, by the processor of the robot, a response to the first user based on the second emotion status; and
    if the first user rejects the response,
    obtaining, by the processor of the robot, at least one type of verification information by using the at least one sensor at the second moment;
    determining, by the processor of the robot, a third emotion status of the first user based on the at least one type of verification information; and
    based on a degree of matching between the third emotion status and the second emotion status, adjusting, by the processor of the robot, the first emotion prediction model.

2. The method according to claim 1, wherein the predicting, by the robot, the second emotion status based on the first emotion status and the first emotion prediction model comprises:
    determining, by the processor of the robot, the first emotion prediction model based on at least one of personalized factor information, conversation scenario information, or external environment information of the first user; and
    predicting, by the processor of the robot, the second emotion status based on the first emotion status and the first emotion prediction model.

3. The method according to claim 2, wherein the determining, by the robot, the first emotion prediction model based on the at least one of personalized factor information, the conversation scenario information, and the external environment information of the first user comprises:
    determining, by the processor of the robot, a second emotion prediction model; and
    correcting, by the processor of the robot, the second emotion prediction model based on at least one of the personalized factor information, the conversation scenario information, and the external environment information of the first user, and determining a corrected second emotion prediction model as the first emotion prediction model.

4. The method according to claim 2, wherein before the predicting the second emotion status based on the first emotion status and the first emotion prediction model, the method further comprises:
    updating, by the processor of the robot, personality information of the first user based on a basic personality template library, to obtain the personalized factor information of the first user.

5. The method according to claim 2, wherein
    the determining the first emotion status of the first user comprises:
    generating, by the processor of the robot, a first emotion signal based on the at least one type of detection information and an emotion digital model;
    searching, by the processor of the robot, an emotion space database for a second emotion signal with a highest degree of matching with the first emotion signal, wherein the emotion space database comprises at least one emotion signal, at least one emotion status, and a correspondence between the at least one emotion signal and the at least one emotion status; and
    determining, by the processor of the robot, an emotion status corresponding to the second emotion signal as the first emotion status.

6. The method according to claim 5, wherein the determining the first emotion signal based on the at least one type of detection information and the emotion digital model comprises:
    determining, by the processor of the robot, the weight of each of the at least one type of detection information;

generating, by the processor of the robot, personal characteristic information of the first user based on the at least one type of detection information and the weight of each of the at least one type of detection information; and determining, by the processor of the robot, the first emotion signal based on the personal characteristic information and the emotion digital model.

7. The method according to claim 6, wherein the determining the weight of each of the at least one type of detection information comprises:

determining, by the processor of the robot, the weight of each of the at least one type of detection information based on the personalized factor information of the first user.

8. The method according to claim 6, wherein the determining, by the robot, the weight of each of the at least one type of detection information comprises:

determining, by the processor of the robot, the weight of each of the at least one type of detection information based on information quality of each of the at least one type of detection information.

9. The method according to claim 5, wherein the method further comprises:

based on a degree of matching between the third emotion status and the second emotion status, adjusting, by the processor of the robot, the personalized factor information of the first user, or adjusting the first emotion prediction model and the personalized factor information of the first user.

10. The method according to claim 5, wherein the at least one sensor comprises:

a sound sensor, an image sensor, a location sensor, an acceleration sensor, a gyro sensor, a geomagnetic sensor, an infrared sensor, an electrocardiogram sensor, a pulse sensor, a skin current sensor, a perspiration sensor, or an electromyographic flow sensor.

11. The method according to claim 2, wherein the conversation scenario information comprises at least one of the following information:

the personalized factor information of a second user, information about a social relationship between the second user and the first user, or data about historical communication between the second user and the first user; wherein the second user is one or more users in conversation with the first user.

12. The method according to claim 2, wherein the external environment information comprises at least one type of the following information:

weather information, geographical location information of the first user, the first moment, or the second moment.

13. The method according to claim 1, wherein the first emotion prediction model is a Hidden Markov Model.

14. A robot, comprising:
a processor; and
a memory coupled to the processor to store instructions, which when executed by the processor, causing the processor configured to:

obtain at least one type of detection information of a first user by using at least one sensor at a first moment;

determine a first emotion status of the first user based on a weight of each of the at least one type of detection information, wherein the first emotion status is an emotion status of the first user at the first moment, and predict a second emotion status based on the first emotion status and a first emotion prediction model, wherein the second emotion status is an emotion status of the first user at a second moment, and the second moment is later than the first moment;

output a response to the first user based on the second emotion status, wherein if the first user rejects the response, the processor is further configured to:

obtain at least one type of verification information by using the at least one sensor at the second moment;

determine a third emotion status of the first user based on the at least one type of verification information; and based on a degree of matching between the third emotion status and the second emotion status, adjust the first emotion prediction model.

15. The robot according to claim 14, wherein the processor is configured to:

determine the first emotion prediction model based on at least one of personalized factor information, conversation scenario information, or external environment information of the first user; and predict the second emotion status based on the first emotion status and the first emotion prediction model.

16. The robot according to claim 15, wherein the processor is configured to:

determine a second emotion prediction model; and
correct the second emotion prediction model based on at least one of the personalized factor information, the conversation scenario information, or the external environment information of the first user, and determine a corrected second emotion prediction model as the first emotion prediction model.

17. The robot according to claim 15, wherein the conversation scenario information comprises at least one of the following information:

the personalized factor information of a second user, information about a social relationship between the second user and the first user, or data about historical communication between the second user and the first user; wherein the second user is one or more users in conversation with the first user.

18. The robot according to claim 15, wherein the external environment information comprises at least one type of the following information:

weather information, geographical location information of the first user, the first moment, or the second moment.

19. The robot according to claim 15, wherein the processor is configured to predict the second emotion status based on the first emotion status and the first emotion prediction model; and update personality information of the first user based on a basic personality template library to obtain the personalized factor information of the first user.

20. The robot according to claim 15, wherein
the processor is configured to:
generate a first emotion signal based on the at least one type of detection information and an emotion digital model, search an emotion space database for a second emotion signal with a highest degree of matching with the first emotion signal, wherein the emotion space database comprises at least one emotion signal, at least one emotion status, or a correspondence between the at least one emotion signal and the at least one emotion status, and determine an emotion status corresponding to the second emotion signal as the first emotion status.

21. The robot according to claim 20, wherein the processor is configured to:
    determine the weight of each of the at least one type of detection information;
    generate personal characteristic information of the first user based on the at least one type of detection information and the weight of each of the at least one type of detection information; and
    determine the first emotion signal based on the personal characteristic information and the emotion digital model.

22. The robot according to claim 21, wherein the processor is configured to
    determine the weight of each of the at least one type of detection information based on the personalized factor information of the first user.

23. The robot according to claim 21, wherein the processor is configured to
    determine the weight of each of the at least one type of detection information based on information quality of each of the at least one type of detection information.

24. The robot according to claim 20, wherein, if the first user rejects the response, the processor is further configured to:
    based on a degree of matching between the third emotion status and the second emotion status, adjust the personalized factor information of the first user, or adjust the first emotion prediction model and the personalized factor information of the first user.

25. The robot according to claim 20, wherein the at least one sensor comprises:
    a sound sensor, an image sensor, a location sensor, an acceleration sensor, a gyro sensor, a geomagnetic sensor, an infrared sensor, an electrocardiogram sensor, a pulse sensor, a skin current sensor, a perspiration sensor, or an electromyographic flow sensor.

26. The robot according to claim 14, wherein the first emotion prediction model is a Hidden Markov Model.

* * * * *